United States Patent [19]
Wikström

[11] Patent Number: 5,692,758
[45] Date of Patent: Dec. 2, 1997

[54] SEALING RING HAVING CIRCULAR-CYLINDRICAL INNER SURFACE AND FLAT SIDE SURFACES WITH CONNECTING TRANSITION SURFACES LEADING TO ROUNDED OUTER SURFACE

[75] Inventor: Roland Wikström, Kusmark, Sweden

[73] Assignee: Skega Seals AB, Ersmark, Sweden

[21] Appl. No.: 651,943

[22] Filed: May 21, 1996

[51] Int. Cl.$^6$ ............................................. F16J 15/10
[52] U.S. Cl. ...................................... 277/165; 277/169
[58] Field of Search .................................. 277/165, 169, 277/177, 206 R, 206 A, 208

[56] References Cited

U.S. PATENT DOCUMENTS

| | | | |
|---|---|---|---|
| 2,547,185 | 4/1951 | Von Bolhar | 277/206 R |
| 2,903,308 | 9/1959 | Barnhart | |
| 3,118,681 | 1/1964 | Fuehrer | |
| 3,231,287 | 1/1966 | Stuempfig | |
| 3,291,497 | 12/1966 | Cross | |
| 3,347,555 | 10/1967 | Norton | 277/177 |
| 3,366,392 | 1/1968 | Kennel | 277/177 |
| 3,472,523 | 10/1969 | Rentschler et al. | 277/206 A |
| 3,592,491 | 7/1971 | Glover | |
| 4,147,368 | 4/1979 | Baker et al. | |
| 4,379,558 | 4/1983 | Pippert | |
| 4,387,902 | 6/1983 | Conover | |
| 4,407,516 | 10/1983 | Le et al. | 277/206 R |
| 4,582,330 | 4/1986 | Lew et al. | |
| 4,598,914 | 7/1986 | Furumura et al. | |
| 4,674,754 | 6/1987 | Lair et al. | |
| 5,172,921 | 12/1992 | Stenlund | |
| 5,531,460 | 7/1996 | Stefansson et al. | 277/206 R |

FOREIGN PATENT DOCUMENTS

| | | | |
|---|---|---|---|
| 1431467 | 12/1966 | France | |
| 2262968 | 7/1973 | Germany | 277/206 R |
| 814265 | 6/1959 | United Kingdom | 277/206 R |

*Primary Examiner*—Scott Cummings
*Attorney, Agent, or Firm*—Renner, Otto, Boisselle & Sklar P.L.L.

[57] ABSTRACT

A static rubber sealing ring for sealing against fluids that have high temperatures and/or that are under high pressures, particularly for sealing between a cylinder lining and a cylinder block of internal combustion engines. With the intention of providing such a sealing ring that can advantageously replace the O-ring, particularly in such vibrating apparatus as piston engines, particularly diesel engines, there is proposed a sealing ring which includes a radially inner sealing surface (12) which is generally circular-cylindrical in shape at least when the sealing ring is fitted, and a pair of generally mutually parallel and axially opposing flat side surfaces (16), each of which extends generally at right angles to the radially inner sealing surface so as to define an edge (14) together therewith, and each of which connects with a gently rounded, radially outer sealing surface (22) of the ring via a transition surface (18, 20).

6 Claims, 3 Drawing Sheets

SEALING RING HAVING CIRCULAR-CYLINDRICAL INNER SURFACE AND FLAT SIDE SURFACES WITH CONNECTING TRANSITION SURFACES LEADING TO ROUNDED OUTER SURFACE

The present invention relates to a static rubber sealing ring for sealing against fluids which have high temperature and/or are under high pressure, particularly for sealing between the cylinder block and cylinder lining of diesel engines.

BACKGROUND OF THE INVENTION

Normally, O-rings are used between the cylinder block and cylinder lining of diesel engines. However, because of their shape, O-rings distribute the surface pressure unevenly and therewith must be subjected to a high sealing force, which has an unfavourable affect on the useful life span of the seal. The small movements that occur between sealing ring and cylinder lining caused by engine vibrations also result in a pumping phenomenon which results in leakage. It has also been established that this movement of the O-rings causes cavitational damage to the cylinder lining. A further problem with O-rings is that they readily warp and skew and are thereby difficult to handle by a fitting robot.

SUMMARY OF THE INVENTION

An object of the present invention is to avoid the aforesaid drawbacks and to provide a sealing ring of the kind defined in the introduction with which requires an effective seal can be established with lower sealing forces and which will dampen vibrations more effectively than known sealing rings or ring gaskets.

This object is achieved with a sealing ring having the features set forth in the following Claim 1.

According to one aspect of the invention, the sealing ring includes a radially inner sealing surface which, at least when the ring is fitted, has a generally circular-cylindrical shape, and a pair of axially opposing flat side surfaces, which are generally parallel with one another and each of which extends generally at right angles to the radially inner sealing surface, so as to form an edge together therewith, and each of which connects with a gently rounded outer sealing surface of the ring via a transition surface.

A sealing ring constructed in accordance with this embodiment will include an active, large inner sealing surface which extends over the full height of the ring and which is terminated at each of its ends with an edge which effectively blocks the access of fluid to the sealing surface.

This embodiment of the sealing ring affords the following advantages, particularly when used in internal combustion engines and then particularly diesel engines: Large inner sealing surface of the sealing ring enables the ring surface pressure to be reduced, therewith resulting in lower sealing forces and therewith in longer useful life spans and improved damping of vibrations. The large inner sealing surface forms a stable base which permits a radially more extended form to have a given cross-sectional shape, which further promotes the vibration damping capacity of the ring. The mutually opposing sharp-cornered edges of the sealing ring reduce the risk of so-called micro-movements that are capable of initiating leakage mechanisms. The shape of the sealing ring against the cylinder lining wall also eliminates the risk of the seal "pumping" when vibrations are transmitted to the engine block from pistons, connecting rods and crank shafts; the risk of cavitational damage to the cylinder lining wall is also reduced thereby. The partially right-angled embodiment also improves the possibility of manufacturing the sealing ring without the ring becoming warped.

When seen in the cross-section of the ring, each transition surface includes preferably a concave contour which narrows the ring in a direction radially outwards. This reduces the cross-sectional radius on the outer sealing surface, so as to enable the sealing force against the cylinder block to be maintained, in comparison with an O-ring seal.

Other features of the invention and other advantages afforded thereby will be apparent from the remaining Claims and also from the following detailed description.

BRIEF DESCRIPTION OF THE DRAWINGS

An exemplifying embodiment of the invention will now be described in more detail with reference to the accompanying drawings, in which.

DETAILED DESCRIPTION

Figure 1:
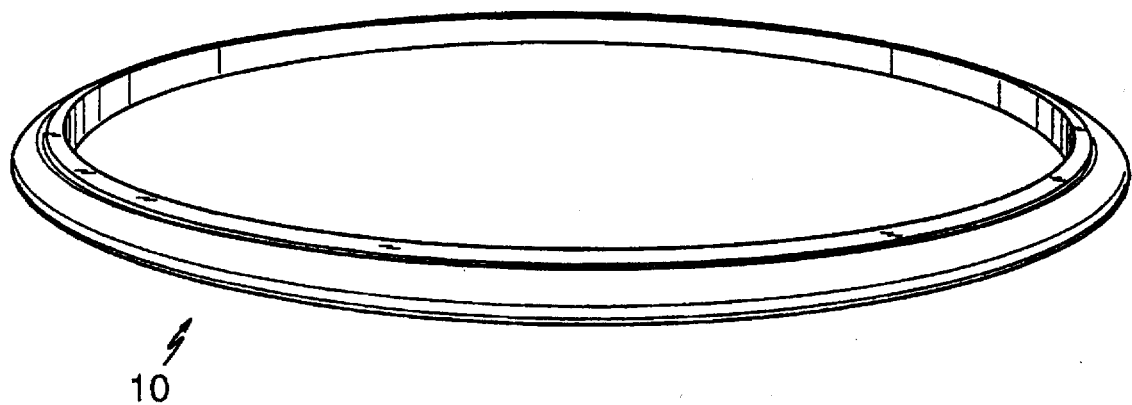
FIG. 1 is a perspective view of an inventive sealing ring.
Figure 2:
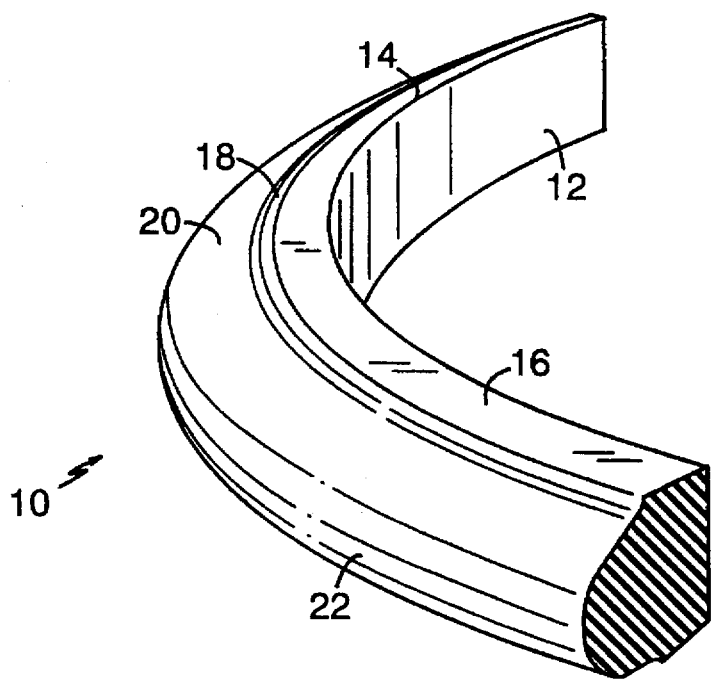
FIG. 2 is a perspective view in larger scale of part of the sealing ring shown in FIG. 1.
Figure 3:
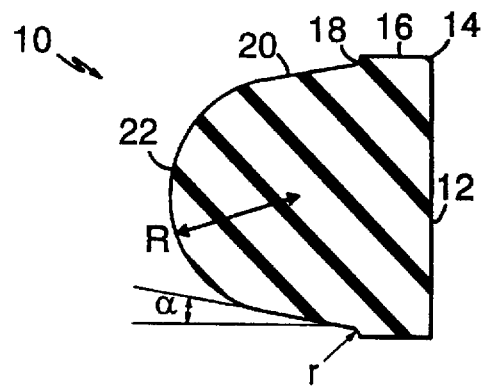
FIG. 3 is a cross-sectional view of the ring shown in FIG. 1.

With particular reference to FIGS. 2 and 3, it will be seen that an inventive sealing ring 10 has a generally bell-shaped contour in cross-section. More specifically, the ring can be considered to be defined by ring-shaped surfaces in accordance with the following: A radial inner sealing surface 12 of circular-cylindrical shape and extending axially over the whole of the ring and terminating at a pair of opposing flat surfaces 16 extending perpendicular to the surface 12. Each of the side surfaces 16 extends radially outwards to a transition surface which includes a surface 18 which is initially concave in cross-section and has a relatively small cross-sectional radius r and terminates in a surface 20 which is flat in cross-section and which slopes inwardly towards the radial centre plane of the ring and defines an angle α together with said centre plane. Each flat surface 20 adjoins the radially outer surface of the ring, tangentially to a common gently rounded, radially outer sealing surface 22 which can be designated partly toroidal, i.e. forms a (radially outer) part of a torus surface having a cross-sectional radius R.

A typical inventive sealing ring that has an inner diameter of, e.g. 142 mm will have a width and a thickness of about 5.8 mm, where r is about 0.2 mm, R is about 2.5 mm and α is about 10°. In order to ensure that the inner sealing surface 12 will have sufficiently uniform rigidity, the flat surfaces 16 have a radial ring width which corresponds suitably to one-third or possibly one-half of the radial material thickness of the ring 10.

Figure 4:
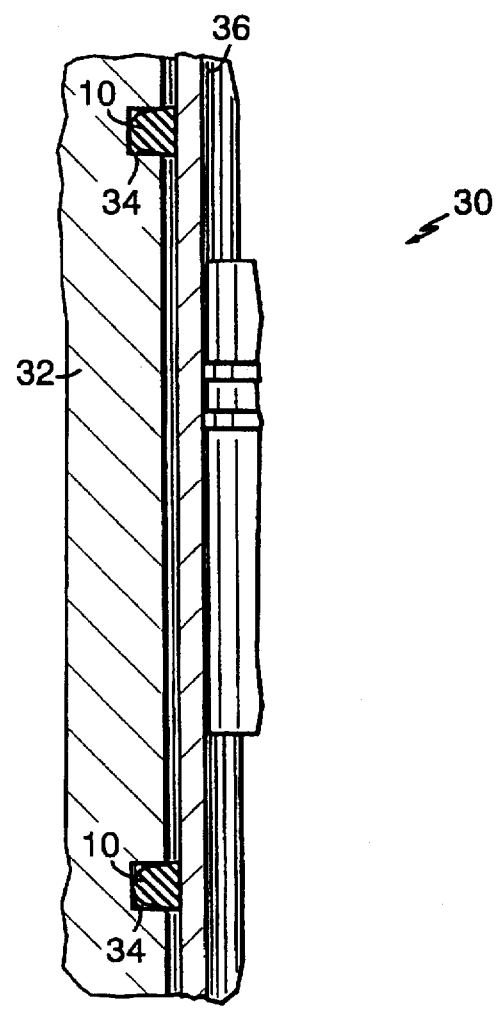
FIG. 4 is a partially sectioned view of part of the sealing region between a cylinder block and a cylinder lining of an internal combustion engine, such as a diesel engine.

The schematic view of FIG. 4 shows a pair of sealing rings 10 fitted in respective ring grooves 34 between a motor block 32 and a cylinder lining 36 of a diesel engine generally referenced 30. Although the sealing rings may be produced from any suitable type of rubber material, it is preferred in the illustrated case that the upper ring 10 fitted on the coolant side is produced from EPDM, while the lower ring 10 fitted on the crank housing side is preferably made of fluororubber, such as Viton®. Although not shown, more than one ring of each type may be fitted on respective sides in a known manner.

Figure 5A:
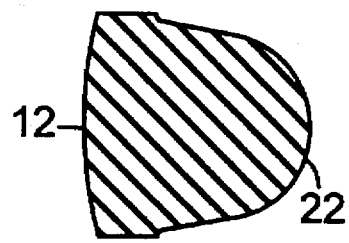
FIGS. 5 A–D are respective cross-sectional views of modified embodiments of the inventive sealing ring.
Figure 5B:
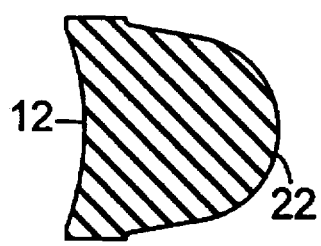

The inner sealing surface 12 need not necessarily be completely circular-cylindrical in shape in order to obtain a pressure distribution over the inner sealing surface 12 which is optimal to the sealing function of the ring 10 when the ring is fitted. Instead, when seen in the relaxed or non-loaded state of the sealing ring, the sealing surface may have a slightly convex or a slightly concave cross-sectional shape, depending on varying nominal operational parameters, such as fluid pressure and engine speed, as illustrated in FIGS. 5A and B.

Figure 5C:
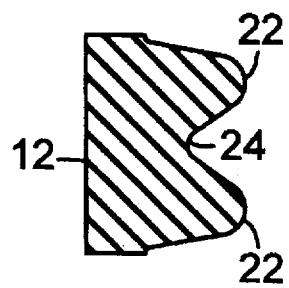
Figure 5D:
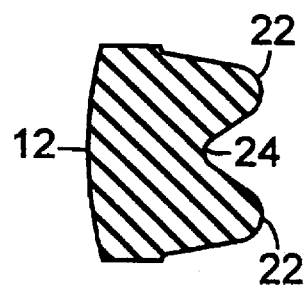

As shown in FIGS. 5C and D, the outer sealing surface of the sealing ring 10 may be divided into ring-shaped ridges 22 by means of at least one ring-shaped groove 24, these ridges functioning to distribute the sealing force in a labyrinth-like fashion advantageous to the sealing function of the ring.

It is assumed that the person skilled in this art will immediately become aware of several modifications that can be made to the described exemplifying embodiments after having studied this description. The description is not intended to limit the scope of the invention, but merely to illustrate those embodiments thereof that are preferred at this moment in time.

What is claimed is:

1. A static rubber sealing ring for sealing against fluids having high temperatures or under high pressures, comprising a radially inner sealing surface which is generally circular-cylindrical in shape in a non-fitted state of the ring, a pair of substantially mutually parallel and axially opposing flat side surfaces, each flat side surface extending generally at right angles to the radially inner sealing surface such as to define an edge together with said sealing surface, and each flat side surface being connected to a gently rounded radially outer sealing surface of the ring via a transition surface, each transition surface, as seen in the cross-section of the ring, being comprised of a radially inner concave contour having a small radius of curvature and narrowing the ring in a radially outward direction, and a radially outer rectilinear contour which, in a direction towards, the outer sealing surface, is inclined to a radial center plane of the sealing ring.

2. A sealing ring according to claim 1, wherein each flat side surface has a radial ring width corresponding to at most half the radial material thickness of the ring.

3. A sealing ring according to claim 1, wherein each flat side surface has a radial ring width corresponding at most to one-third of the radial material thickness of the ring.

4. A sealing ring according to claim 1, wherein, when seen in the cross-section of the ring, the radially inner sealing surface is slightly convex in said non-fitted state of the ring.

5. A sealing ring according to claim 1, wherein, when seen in the cross-section of the ring, the radially inner sealing surface is slightly concave in said non-fitted state of the ring.

6. A sealing ring according to claim 1, wherein the outer sealing surface has at least one groove extending in the circumferential direction of the ring.

* * * * *